Sept. 14, 1943.  C. M. ANDERSON  2,329,576
SLUSH PUMP VALVE
Filed Jan. 27, 1942
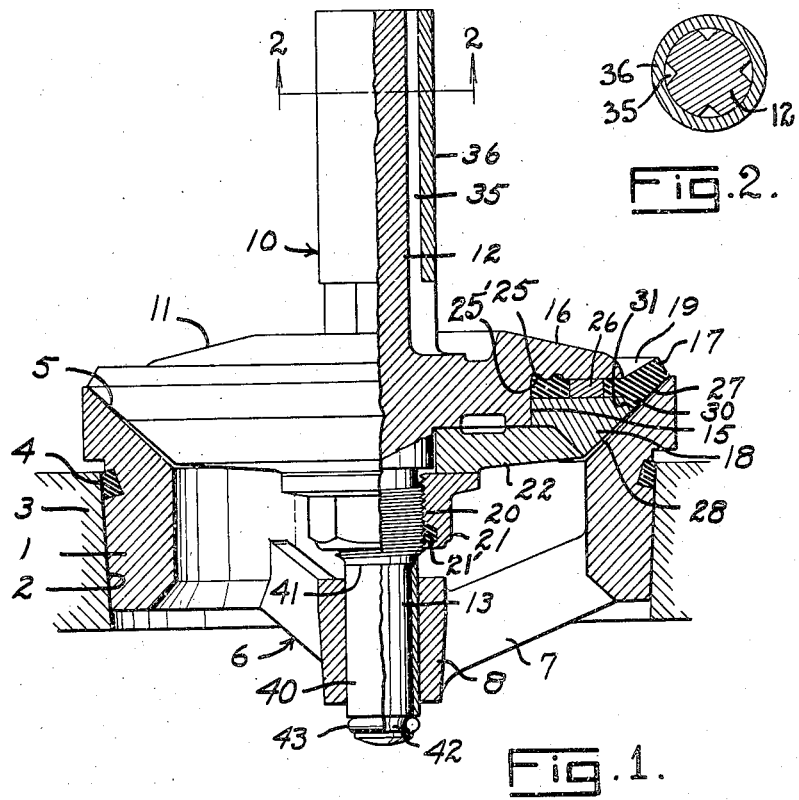
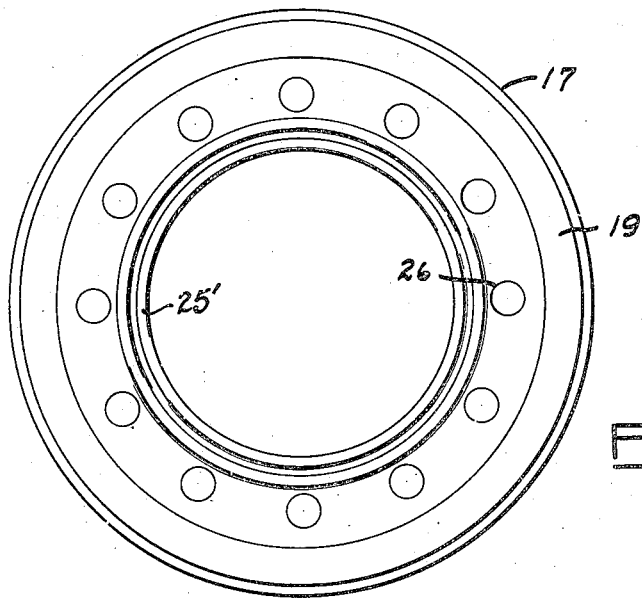
CARL M. ANDERSON
INVENTOR.
BY Lester B. Clark.
ATTORNEY.

Patented Sept. 14, 1943

2,329,576

UNITED STATES PATENT OFFICE 2,329,576

SLUSH PUMP VALVE

Carl M. Anderson, Corsicana, Tex., assignor to American Well & Prospecting Company, Corsicana, Tex., a corporation Application January 27, 1942, Serial No. 428,341

3 Claims. (Cl. 251—127)

This invention relates to a valve, and more particularly to a novel form of valve especially adapted for use in high pressure pumps for abrasive carrying fluids such as mud pumps employed for pumping drilling fluid in the rotary method of drilling deep wells.

In pumps of the type used in the drilling of deep wells it is necessary to provide valves which are capable of withstanding heavy pressures and resisting wear and the effects of heavy impacts for long periods of time. At the same time, such valves must operate efficiently in producing a seal against leakage through the valve of fluid being pumped.

It is an object of the invention to provide a valve in which the engageable and relatively movable parts may be replaced when worn.

It is also an object to provide a valve having replaceable wear-resistant parts of small cross section whereby the volume of material comprising such parts is minimized.

Another object is to provide a valve having a packing gasket and wear plate with substantially contiguous surfaces adapted to engage the valve seat to arrest the movement of the valve and to form a seal between the seat and the valve where such parts are replaceable.

The foregoing are primary objects which, together with other objects, will be more fully apparent from a consideration of the following description taken in connection with the accompanying drawing in which:

Fig. 1 is an elevational view partly in section showing a valve construction embodying the invention;

Fig. 2 is a sectional view taken on the line 2—2 in Fig. 1;

Fig. 3 is a plan view of the packing gasket comprising an element of the valve.

The valve shown in the drawing and embodying the invention comprises a seat ring 1 seated in the opening 2 in the pump body 3. The opening 2 and the periphery of the ring 1 are tapered to form a tight joint which is supplemented by a packing ring 4 so that a seal between the ring and body is assured.

The upper end of the ring 1 is beveled at 5 to serve a function that will presently appear. The lower portion of the seat ring is provided with a spider 6 comprising arms 7 terminating centrally in a boss 8 to receive the valve stem and guide the valve assembly.

The valve proper, or valve assembly, comprises a body 10 having an enlarged portion 11 and oppositely extending stem portions 12 and 13. The enlarged portion is reduced at 15 whereby there is provided a flange 16 which is engaged by the upper face of the packing ring 17. An annular wear plate 18 of wear-resistant material such as metal, harder rubber or other compositions, also surrounds the reduced portion 15 of the body and engages the nether face of the packing ring 17.

Closely adjacent the enlarged portion 11 the stem 13 is threaded at 20 to receive a stop nut 21 which engages a retainer plate 22 which in turn engages the wear plate 18 so that the assembly just described is maintained as a unitary composite structure. A fibre ring 21' may be provided in the nut 21 to prevent the nut from loosening on the threads 20.

The flange 16 may be provided with indentations 25 on its lower surface to receive complemental projections 25' on the upper surface of the packing ring 17 to assist in preventing any relative movement between these parts and also to perfect a fluid-tight seal between the parts.

The packing ring 17 may also include a plurality of spacer plugs 26 molded therein, such plugs determining the spacing of the parts which confine the inner portion of the packing ring 17.

Outwardly of the peripheral edge of the flange 16 the packing ring terminates in an annulus 19 of thickened cross section having a nether tapered face 27 to engage the surface 5 on the seat ring. The face 27 and the surface 28 on the wear plate 18 lie in substantially the same conical surface so that the engagement of such surfaces with the surface 5 serves respectively to form a seal between the valve and seat and to arrest movement of the valve assembly. The wear plate 18 is cut away peripherally to form the surface 31 which forms an angle greater than 90° with the surface 28 thereof. This shoulder serves to support the flexible ring. It seems apparent that this construction is such as to provide a pair of replaceable surfaces. One of these surfaces 27 on the ring 17 is flexible to seal and the other 28 on the retainer plate 22 takes the thrust of stopping the valve. Thus, all the wearable parts of the seating and sealing areas are readily replaceable.

As best seen in Fig. 2, the stem 12 is fluted as shown at 35 and a replaceable hardened guide sleeve 36 is positioned thereon. The stem and sleeve are adapted to slidably fit within a suitable guide member (not shown) so that axial movement of the valve is assured.

The lower stem 13 is of a diameter to receive a replaceable hardened guide sleeve 40 of which the upper end engages a shoulder 41 on the stem beneath the threads 20. A groove 42 in the lower end of the stem 13 receives a spring snap ring 43 which holds the sleeve 40 in place.

In the operation of the valve embodying the invention the valve 10 moves upwardly, as is well known, to admit fluid through the seat ring 1. As the valve moves downwardly to closed position to prevent reverse flow, the annulus 19 moves into engagement with the uppermost portion of the surface 5 on the seat ring 1. Substantially simultaneous with this engagement the surface 28 on the wear plate 18 engages the lower portion of the seating surface 5, thus assuming the shock incident to the termination of movement of the valve and the pressure of fluid thereagainst. Such latter engagement also completes the formation of the annular groove into which the annulus portion 19 of the packing ring 17 fits. Fluid bearing against the annulus 19 effects an efficient seal that prevents any leakage of fluid through the valve.

The principal parts of the device subject to destructive effects when in use are the bushings 36 and 40, the packing ring 17, and the wear plate 18. Obviously, any or all of these parts can be replaced or repaired without complete replacement of the valve. A particular advantage of the invention described in the illustrated embodiment resides in the configuration of parts whereby the annulus 19 provides an effective seal without undue destructive effects thereon. The invention hence provides a simple construction in which worn parts are readily replaceable and movement of the valve is terminated by a wear plate which cooperates with a packing ring to form an effective seal between the valve and its seat.

Broadly, the invention comprehends a novel valve construction in which the valve stopping and sealing areas which are most subject to wear are replaceable when worn.

What is claimed is:

1. A valve including a tapered seat, a body having a main portion and a flange extending outwardly therefrom and overlying an inner portion only of said seat, an annular packing gasket surrounding said main portion and having a sealing annulus extending outwardly beyond said flange to overlie the outer portion of said tapered seat, and a wear plate clamping said gasket in engagement with said flange, the outer surfaces of said gasket and said wear plate comprising contiguous downwardly tapering surfaces adapted to engage said seat, and a retainer plate carried by said body to clamp said wear plate and said gasket against said flange.

2. A slush pump valve assembly including a stem, a flange integral therewith, a stepped under surface on said flange, a packing ring engaging the under side of one of the steps of said flange so as to project therefrom, a wear plate beneath and engaging said ring and extending outwardly of said flange to support said ring against the pressure being valved, sealing and seating faces on said ring and plate respectively which lie in the same conical surface to engage a valve seat, a retainer plate engaging another stepped area on the flange and arranged to retain said ring and wear plate, and a nut threaded on the stem to clamp said retainer plate to the stem.

3. A slush pump valve assembly including a stem, a flange integral therewith, a stepped under surface on said flange, a packing ring engaging the under side of said flange and projecting therefrom, a wear plate beneath and engaging said ring, sealing and seating faces on said ring and plate respectively which lie in the same conical surface to engage a valve seat, a retainer plate engaging the stepped area on the flange and arranged to retain said ring and wear plate, a nut threaded on the stem to clamp said retainer plate to the stem, and replaceable wear-resistant bushings carried by said stem above and below said flange.

CARL M. ANDERSON.